(12) United States Patent
Suzuki

(10) Patent No.: US 8,616,458 B2
(45) Date of Patent: Dec. 31, 2013

(54) NON-CONTACT IC TAG

(71) Applicant: Kitagawa Industries Co., Ltd, Nagoya (JP)

(72) Inventor: Yasuyuki Suzuki, Nagoya (JP)

(73) Assignee: Kitagawa Industries Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 13/677,649

(22) Filed: Nov. 15, 2012

(65) Prior Publication Data
US 2013/0119144 A1  May 16, 2013

(30) Foreign Application Priority Data
Nov. 16, 2011 (JP) ................................. 2011-250835

(51) Int. Cl.
*G06K 19/00* (2006.01)
(52) U.S. Cl.
USPC ........................................ 235/492; 235/487
(58) Field of Classification Search
USPC .............................. 235/487, 492; 340/10, 572
See application file for complete search history.

(56) References Cited

U.S. PATENT DOCUMENTS

| 7,163,155 B2 * | 1/2007 | Briancon et al. ............... 235/492 |
| 2006/0243811 A1 * | 11/2006 | Koyama et al. ............... 235/492 |
| 2010/0012721 A1 | 1/2010 | Jain et al. |

FOREIGN PATENT DOCUMENTS

| JP | 2008134867 A | 6/2008 |
| WO | 2007/066267 A2 | 6/2007 |

OTHER PUBLICATIONS

Extended European Search Report for the corresponding European application.

* cited by examiner

*Primary Examiner* — Michael G Lee
*Assistant Examiner* — Matthew Mikels
(74) *Attorney, Agent, or Firm* — Davis & Bujold, PLLC; Michael J. Bujold

(57) ABSTRACT

A non-contact IC tag of the present invention includes a first member including an IC chip and a first antenna connected to the IC chip; a second member including a second antenna; and a movement restriction unit that, when the first member is moved to a predetermined position in the second member, restricts a movement of the first member from the predetermined position. The predetermined position is a position where the first antenna and the second antenna are electromagnetically coupled to each other or a position where the first antenna and the second antenna are electrically conducted to each other.

8 Claims, 4 Drawing Sheets

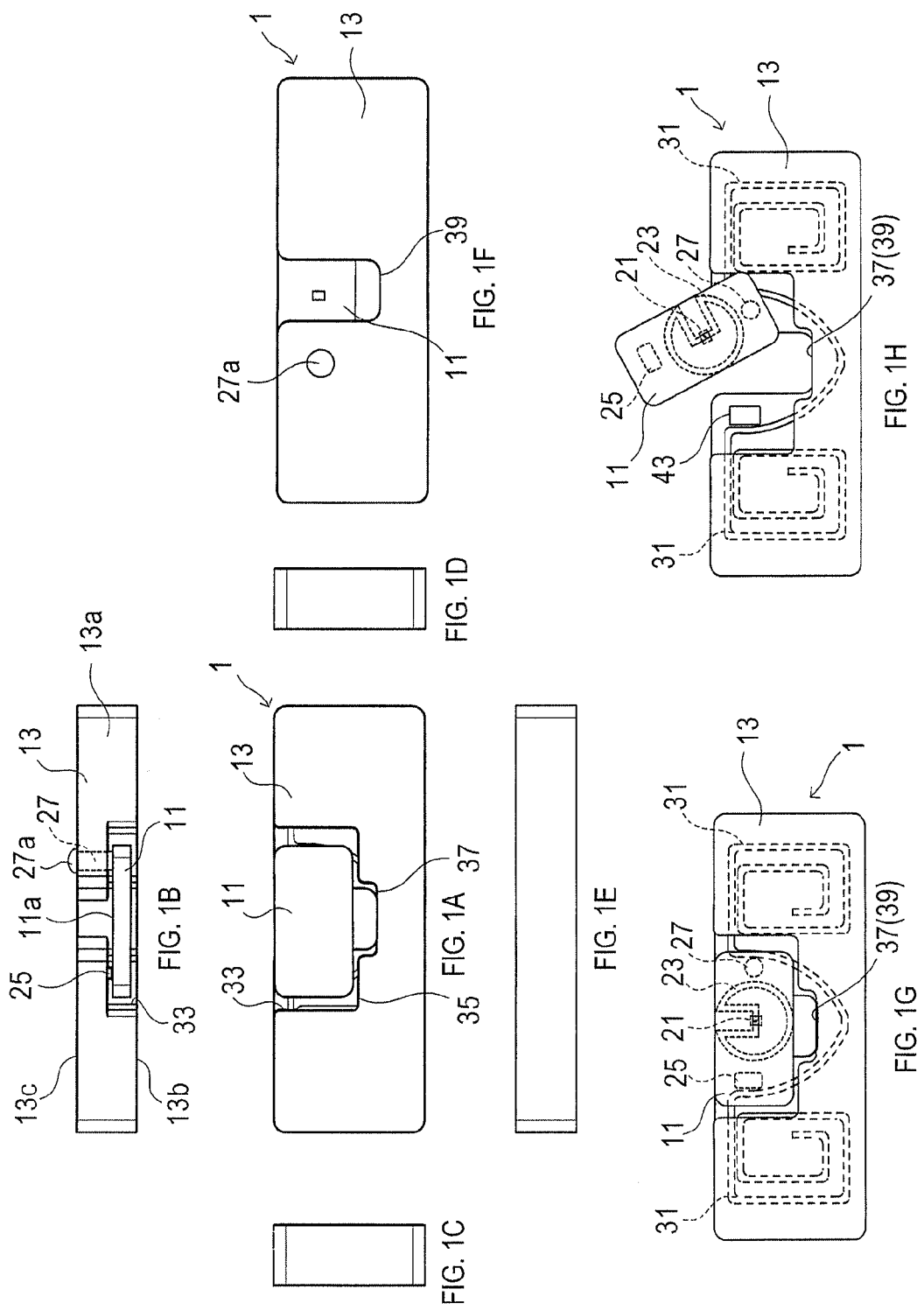

NON-CONTACT IC TAG

CROSS-REFERENCE TO RELATED APPLICATIONS

This application claims the benefit of Japanese Patent Application No. 2011-250835 filed Nov. 16, 2011 in the Japan Patent Office, the disclosure of which is incorporated herein by reference.

BACKGROUND

The present invention relates to a non-contact IC tag that communicates with a reader/writer using RFID technology.

An IC tag (also referred to as an RFID tag, an IC card, an RFID card, and the like) is utilized in various fields such as transportation, distribution, management of goods and baggage, credit cards, and ID cards. This is because the IC tag can store a large amount of information in an IC chip and has an excellent security function compared with a conventionally-used magnetic stripe card and the like.

Moreover, a non-contact IC tag that communicates wirelessly with a reader/writer is more convenient because such a non-contact IC tag is easy to handle and is not subject to wear from contact.

When using such a non-contact IC tag, sometimes it is desired to switch its function ON/OFF. For example, as described in FIG. 6 of Japanese Unexamined Patent Application Publication No. 2008-134867, a non-contact IC tag is attached to a shoe box at first, and when shoes are displayed in a store, a part of the non-contact IC tag is separated off and attached to the shoes to thereby disable the function, as a non-contact IC tag, of the non-contact IC tag attached on the shoe box.

SUMMARY

There is a demand for switching the function of the non-contact IC tag from OFF to ON. For example, in a production line of a factory, the non-contact IC tag is attached to a product in advance, and after inspection of the finished product, the function of the non-contact IC tag is enabled. That makes it possible to detect completion of the inspection through communication with the non-contact IC tag.

However, in the above-described publication, although the function, as a non-contact IC tag, of the non-contact IC tag attached on the shoe box can be disabled, it is impossible to enable the function again. As seen from this, there has conventionally existed no non-contact IC tag which can switch ON/OFF at will.

An aspect of the present invention is, in a non-contact IC tag, to be able to easily enable/disable readout by a reader/writer.

An explanation will be given below about a configuration of a non-contact IC tag of the present invention.

The present invention relates to a non-contact IC tag that includes a first member including an IC chip and a first antenna connected to the IC chip; a second member including a second antenna; and a movement restriction unit that, when the first member is moved to a predetermined position in the second member, restricts a movement of the first member from the predetermined position. The predetermined position is a position where the first antenna and the second antenna are electromagnetically coupled to each other or a position where the first antenna and the second antenna are electrically conducted to each other.

In the non-contact IC tag configured as such, when the first member is retained in the predetermined position by means of the movement restriction unit, the second antenna is utilized as a booster antenna, or the first antenna and the second antenna are electrically conducted to each other to thereby extend the antennas. Due to such a configuration, longer-distance communication can be performed than a case where only the first antenna is used. In contrast, when the first member is positioned in a position other than the predetermined position, the second antenna cannot be utilized and only short-distance communication can be performed.

Accordingly, it is possible to change a communication distance of the non-contact IC tag by only moving the first member to the predetermined position in the second member or moving the first member away from the predetermined position. That makes it possible to easily change whether or not readout of the non-contact IC tag can be performed by the reader/writer.

It is preferable that the first member is set such that a communication distance is very short when the second antenna is not utilized. For example, by setting the first antenna to be a close coupling type having a communication distance of about 2 mm, it can be suppressed that, when a readout by the reader/writer is not desired, such a readout is performed against will.

It is preferable to use the second antenna having a gain greater than that of the first antenna.

The movement restriction unit may be configured to strongly suppress the movement of the first member from the predetermined position. Specifically, the movement restriction unit may have a configuration in which part of the non-contact IC tag needs to be broken or distorted in order to move the first member. Alternatively, the movement restriction unit may be configured such that the first member can be easily moved by applying a given amount or more of force or by carrying out a predetermined manipulation.

As described above, the first antenna and the second antenna may be configured to be electromagnetically coupled to each other or to be electrically conducted to each other when the first antenna is in the predetermined position. When a configuration is adopted in which the first antenna and the second antenna are electromagnetically coupled to each other, flexibility in shapes of the first member and the second member is increased because the first antenna and the second antenna do not need to be electrically conducted directly. In addition, strictness for alignment of the first member and the second member is reduced to thereby to produce an advantage that an error such as communication failure despite the fact that the first member is positioned in the predetermined position can be suppressed from occurring.

The movement of the first member is achieved by externally applied force and, therefore, the first member can be moved by being manipulated by hand, for example.

The first member may be configured to be able to be displaced from the predetermined position. Here, "be able to be displaced from the predetermined position" means that the first member can be moved between the predetermined position and an arbitrary position other than the predetermined position.

Moreover, the non-contact IC tag may be configured to include a coupling unit that couples the first member and the second member to each other so that the first member can be displaced.

Such a configuration makes it possible to suppress the first member and the second member from being separated from each other even when the first member is not in the predetermined position. It can be thereby suppressed that either of the first member and the second member is lost, for example. In addition, when the non-contact IC tag of the present invention is attached for use to an object, it is sufficient to either of the first member and the second member is fixed to the object to thereby facilitate handling of the non-contact IC tag.

A specific configuration of the coupling unit is not limited particularly, and various configurations may be adopted as long as the first member and the second member can be coupled to each other. For example, a configuration may be adopted in which the first member and the second member are coupled to each other by means of a component, which is independent of the first member and the second member and interposed therebetween. Alternatively, on either of the first member and the second member, a retainer to retain the other member may be provided.

A configuration may be adopted in which the first member can be rotated and displaced about a predetermined axis of rotation with respect to the second member when the first member and the second member are coupled to each other by means of the coupling unit. The non-contact IC tag configured as such makes it possible to align the first member to the predetermined position by rotating the first member to thereby facilitate manipulation of the non-contact IC tag.

Also, the first member may be configured to be slidable with respect to the second member within a predetermined range.

The first member and the second member may be configured to form an annular body at least when the first member is in the predetermined position, and to open a part of the annular body when the first member is in an open position which is different from the predetermined position.

The non-contact IC tag configured as such makes it possible to retain a cable, a string-like member, a rod-like member, or the like, for example, inside the annular body formed when the first member is in the predetermined position. Accordingly, arrangement of the cable or the like in the non-contact IC tag and attachment of the non-contact IC tag to baggage or a product can be easily performed.

Since a part of the annular body needs to be opened when the cable or the like is removed from the non-contact IC tag, the first member is to be moved from the predetermined position and, as a result, a communication distance of the non-contact IC tag becomes shorter. Accordingly, it is possible to detect that the cable is removed from the non-contact IC tag or that the non-contact IC tag is removed from the baggage or the product by a change in communication distance with the non-contact IC tag, or specifically, by whether or not readout by the reader/writer can be performed.

The annular body only has to be configured such that an object such as a cable arranged in the annular body cannot be removed without moving the first member. Therefore, the annular body does not need to be completely closed and may be opened partially. Furthermore, the annular body may be configured to be opened to an extent in which the object can be removed when the first member is moved from the predetermined position.

BRIEF DESCRIPTION OF THE DRAWINGS

The embodiment of the present invention will be described below with reference to the accompanying drawings, in which:

FIG. 1A is a front view showing a non-contact IC tag.
FIG. 1B is a plan view showing the non-contact IC tag.
FIG. 1C is a left side view showing the non-contact IC tag.
FIG. 1D is a right side view showing the non-contact IC tag.
FIG. 1E is a bottom view showing the non-contact IC tag.
FIG. 1F is a rear view showing the non-contact IC tag.
FIG. 1G is a front view showing a state where an inside of the non-contact IC tag is seen through.
FIG. 1H is a front view showing a state where a first member is moved in FIG. 1G.
FIGS. 4A to 4D are perspective views.
FIG. 4E is a plan view showing a state where
FIG. 4D is viewed from above.
FIG. 4F is a rear view showing a state where
FIG. 4D is viewed from the rear.

DETAILED DESCRIPTION OF THE PREFERRED EMBODIMENTS

Embodiment (1) Entire Configuration

Figure 2A:
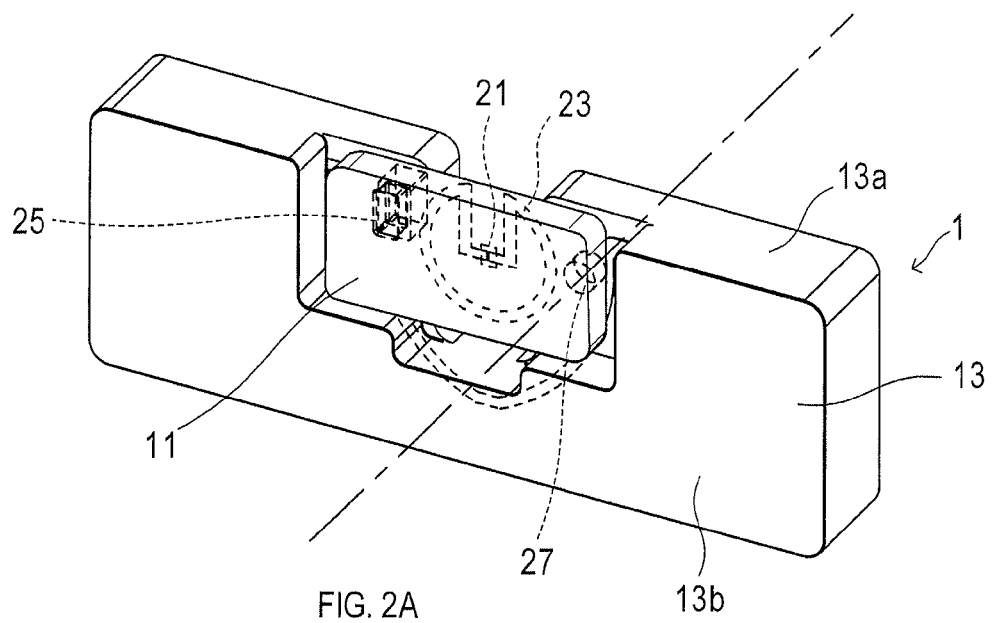
FIG. 2A is a perspective view of the non-contact IC tag.

A non-contact IC tag 1 of the present embodiment is shown in FIGS. 1A to 1H, 2A, and 2B. The non-contact IC tag 1 of the present embodiment includes a first member 11 and a second member 13. The first member 11 is in a form of a resin plate, whose four corners are chamfered. The second member 13 is in a form of a resin plate, whose four corners are chamfered and which has a gap portion 33 formed therein that can house the first member 11.

As shown in FIGS. 1G, 1H, 2A, and 2B, the first member 11 includes thereinside an IC chip 21 having a semiconductor memory therein, and a loop-shaped first antenna 23 connected to the IC chip 21 and arranged along major surfaces of the first member 11.

Figure 3A:
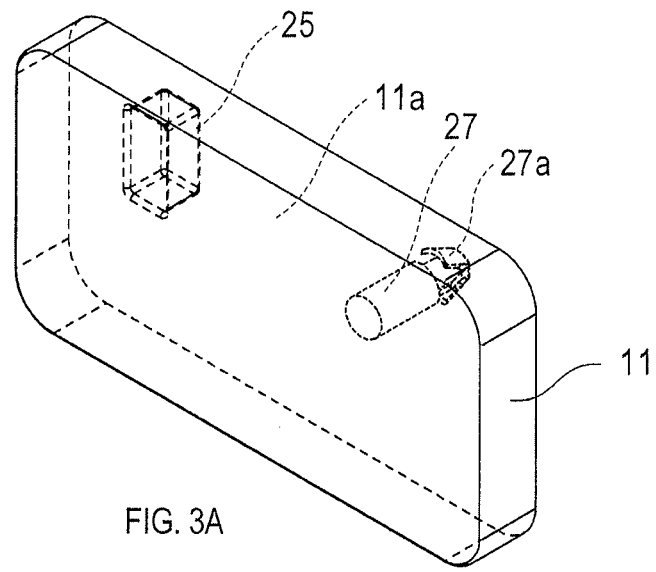
FIG. 3A is a perspective view of the first member.

FIG. 3A is an enlarged view of only the first member 11. In FIG. 3A, the IC chip 21 and the first antenna 23 are omitted.

Of the two major surfaces of the first member 11, a surface 11a (a surface positioned on the back side in FIG. 3A) facing the second member 13 has a protruding portion 25 and an axial portion 27 projecting therefrom in a direction perpendicular to the surface 11a. The protruding portion 25 has an approximately rectangular parallelepiped shape. The axial portion 27 is column-like in shape and has an arrowhead-shaped snap 27a formed on an end thereof.

Figure 2B:
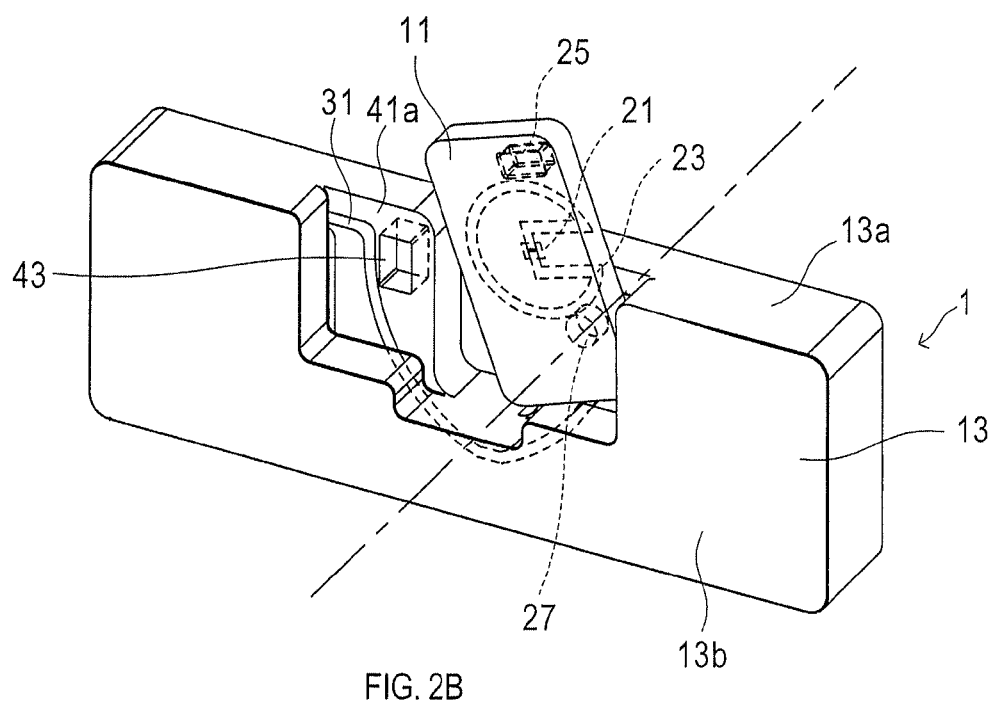
FIG. 2B is a perspective view showing a state where the first member is moved in FIG. 2A.
Figure 3B:
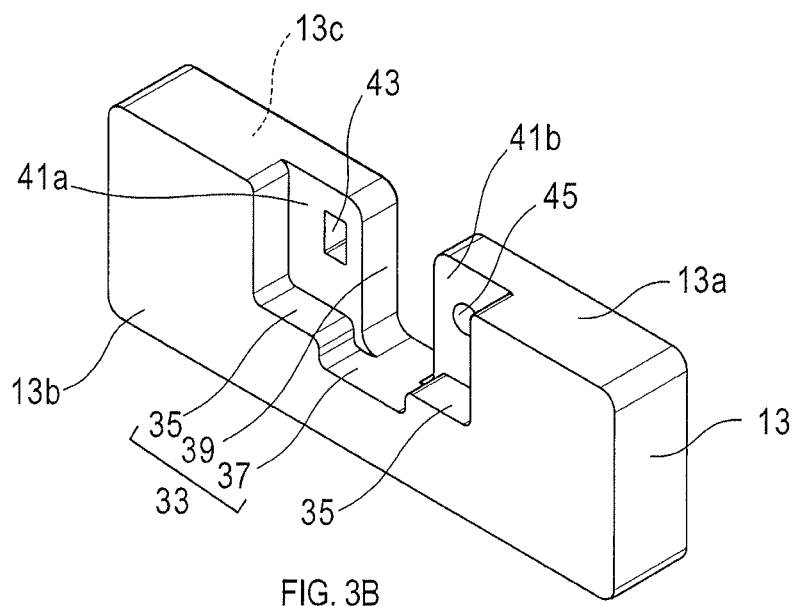
FIG. 3B is a perspective view of a second member.

As shown in FIGS. 1G, 1H, 2A, and 2B, the second member 13 includes a second antenna 31. FIG. 3B is an enlarged view of only the second member 13. In FIG. 3B, the second antenna 31 is omitted.

The second member 13 has the gap portion 33 so formed as to be recessed from an upper side 13a, which is one of the sides intersecting with major surfaces of the second member 13. Part of the gap portion 33 penetrates from a front side 13b to a back side 13c, both of which are the major surfaces. A shape of the gap portion 33 on a side of the front side 13b and a shape of the gap portion 33 on a side of the back side 13c are different from each other.

Specifically, on the side of the front side 13b, a first gap 35 is formed, which is larger than the first member 11, and a second gap 37 is further formed from a central part of a bottom surface of the first gap 35. On the side of the back side 13c, a third gap 39 is formed, whose bottom surface forms a same plane as a bottom surface of the second gap 37. A width of the third gap 39 in a longitudinal direction of the second member 13 is smaller than that of the first gap 35 in a longitudinal direction of the second member 13. As a result, stepped sections are formed in the gap portion 33 in a front-back direction of the first member 11 to thereby form inner sides 41a and 41b, which are parallel to the front side 13b and the back side 13c, on both sides of the third gap 39.

On the inner side 41a, an opening 43 is formed, which is an approximately rectangular gap, and on the inner side 41b, a cylindrical through-hole 45 is formed.

The second antenna 31 provided in the second member 13 is formed embedded thereinside except for some parts exposed on the inner sides 41a and 41b.

The first member 11 and the second member 13 explained as above are rotatably and displaceably coupled to each other about the axial portion 27 by inserting the axial portion 27 into the through-hole 45. Once the snap 27a of the axial portion 27 passes through the through-hole 45, the snap 27a is locked at an end of the through-hole 45 on the side of the back side 13c to thereby suppress the axial portion 27 from coming out of the through-hole 45.

When the first member 11 is displaced to a predetermined position (a position shown in FIGS. 1G and 2A) by being rotated about the axial portion 27, part of the protruding portion 25 is inserted into and engaged with the opening 43 to thereby suppress the first member 11 from rotating. In this manner, a movement of the first member 11 and the second member 13 from the predetermined position is restricted by means of the axial portion 27 inserted into the through-hole 45 and the protruding portion 25 inserted into the opening 43. That is, the axial portion 27 and the protruding portion 25 correspond to a movement restriction unit of the present invention. The axial portion 27 further functions as a coupling unit that couples the first member 11 and the second member 13.

In such a situation, an annular body is formed of the first member 11 and the second member 13. A central opening of the annular body is composed of the second gap 37 and a lower part of the third gap 39. Such a state where the first member 11 is in the predetermined position is hereinafter referred to as a lock state.

In the lock state, when a given amount or more of force is applied in a direction to rotate the first member 11, locking of the protruding portion 25 with respect to the opening 43 is released to thereby enable the first member 11 to be rotated and displaced to a position other than the predetermined position. As a result, as shown in FIGS. 1H and 2B, the annular body becomes a state where a part thereof is opened. Such a state is hereinafter referred to as an unlock state.

(2) Communication Function of the Non-Contact IC Tag 1

When the first member 11 is not in the lock state, i.e., when the first member 11 is in the unlock state as shown, for example, in FIGS. 1H and 2B, wireless communication by the non-contact IC tag 1 with a reader/writer is achieved by utilizing only the first antenna 23. Accordingly, a communication distance is very short (about 2 mm, for example).

In contrast, when the first member 11 is in the lock state, the first antenna 23 and the second antenna 31 are electromagnetically coupled to each other to thereby allow the communication distance to be dramatically longer (several meters or the like, for example).

(3) Usage Example

An explanation will be given below about an example in which the non-contact IC tag 1 of the present embodiment is used as a security product that monitors whether a cable wired in an electronic device is appropriately attached.

Figure 4A:
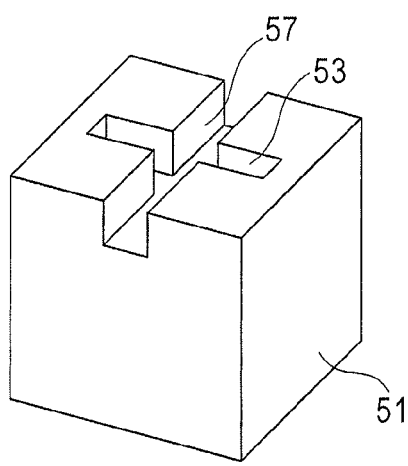
FIGS. 4A to 4F are diagrams explaining usage examples of the non-contact IC tag.

A box 51 shown in FIGS. 4A to 4F is a part of a housing in an electronic device and is schematically illustrated. As shown in FIG. 4A, a groove 53 into which the non-contact IC tag 1 is inserted and a groove 57 in which a cable 55 is arranged are formed on a surface of the box 51.

Figure 4B:
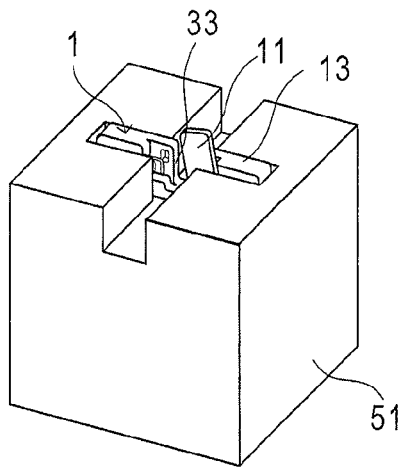

FIG. 4B illustrates a state where the non-contact IC tag 1 is inserted into the groove 53. The second member 13 of the non-contact IC tag 1 is fixed to the box 51 in such a state.

Figure 4C:
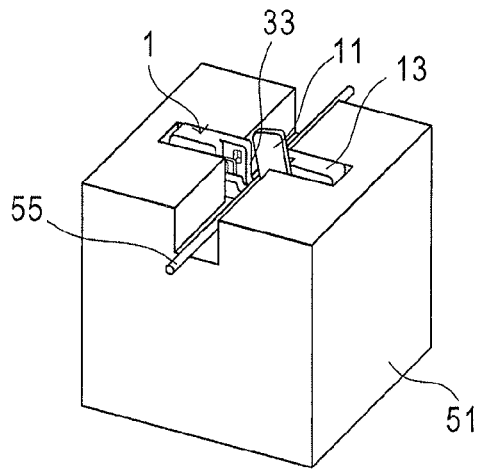
Figure 4D:
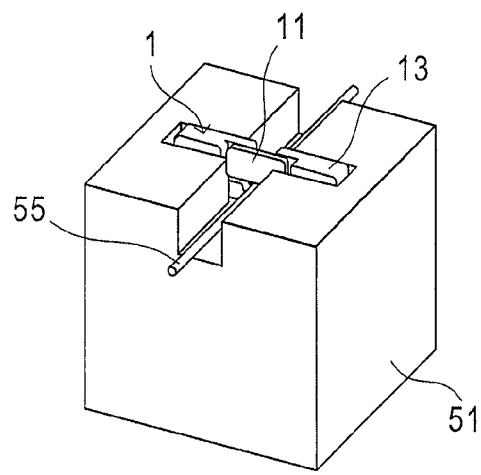
Figure 4E:
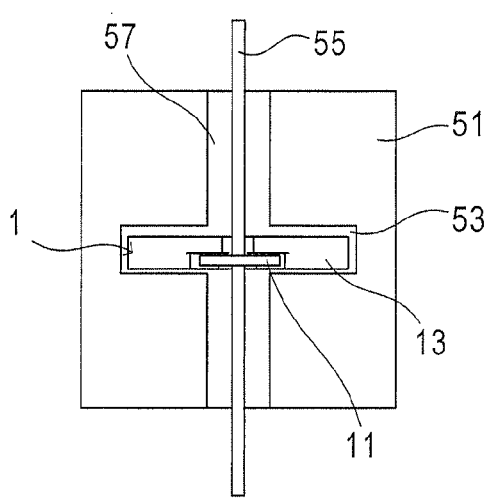
Figure 4F:
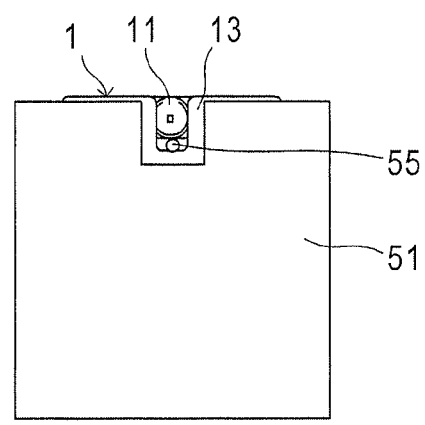

As shown in FIG. 4C, as a result of placing the first member 11 of the non-contact IC tag 1 into the unlock state, the cable 55 can be arranged in the gap portion 33. Here, when the first member 11 is rotated to form the annular body and to be placed into the lock state, the cable 55 is retained in the non-contact IC tag 1. In such a state, the second antenna 31 works to thereby allow the communication distance of the non-contact IC tag 1 to be longer.

Accordingly, in the above-described state where the communication distance becomes longer, communication with the non-contact IC tag 1 is confirmed by the reader/writer capable of Near Field Communication (ISO 15693) and remote communication, and thus it can be confirmed that the non-contact IC tag 1 is in the lock state, i.e., that the cable 55 is housed in an appropriate position.

In order to remove the cable 55, it is necessary to break the non-contact IC tag 1 or move the first member 11 to place the non-contact IC tag 1 into the unlock state. Since the communication with the non-contact IC tag 1 by the reader/writer is disabled in such a case, removal of the cable 55 and/or breakage of the non-contact IC tag 1 can be detected.

In the above usage example, a configuration has been exemplified in which the grooves for arrangement of the non-contact IC tag 1 and the cable 55 are formed. However, it is sufficient, at least, that the non-contact IC tag 1 can be fixed to the box 51 and, therefore, the above-described grooves do not necessarily need to be formed.

(4) Effects

According to the non-contact IC tag 1 of the present embodiment, switching can be easily performed between the lock state where a long-distance communication with the reader/writer is enabled and the unlock state where the long-distance communication is disabled by merely rotationally moving the first member 11.

Moreover, since the first member 11 and the second member 13 are coupled to each other by means of the axial portion 27, it can be suppressed that either of the first member 11 and the second member 13 is lost.

Furthermore, in the lock state, the annular body is formed of the first member 11 and the second member 13 to thereby retain a cable or the like conveniently. In addition, since the long-distance communication cannot be performed if the non-contact IC tag 1 is not in the lock state, it is possible to detect from the readout result that the cable or the like has been removed by placing the non-contact IC tag 1 into the unlock state or breaking the non-contact IC tag 1.

(5) Other Usage Examples

Other than the above-described usage example, usages such as (i) to (iv) below are possible. In some of the usage examples below, the non-contact IC tag 1 of the above embodiment cannot be utilized as it is in unchanged form. In such a case, a form of the non-contact IC tag 1 may be changed as appropriate. In the descriptions below, a first member refers to a member including the IC chip and the first antenna, and a second member refers to a member including the second antenna. In the specific examples below, the first member and the second member may be provided on an object in advance, or may be attached and fixed to the object before use.

(i) Detection of Opening of Cap

As for a container whose cap is opened/closed, it is possible to detect opening/closing of the cap. Specific examples include a bottle, a can, a gas can, a kerosene can, and the like. In addition, the non-contact IC tag may be used to detect opening/closing of a faucet. In a case of a bottle, the first antenna is installed in the cap assumed as the first member, and the second antenna is installed in the bottle assumed as the second member. That is, the non-contact IC tag is configured such that communication can be performed by means of the second antenna when the cap is closed. Since a distance between the first antenna and the second antenna is increased by the opening of the cap, long-distance communication cannot be performed.

By configuring the non-contact IC tag as above, it is possible, for example, when detecting a defective product with its cap opened from among a plurality of bottles, to detect the defective product by communication confirmation when visual detection would be difficult.

(ii) Lock/Unlock Detection (Locked Key)

The non-contact IC tag can be used for lock/unlock detection. Specific examples include an umbrella stand, a padlock, a door, a post, a box top, a small container top, and the like. Each of them includes a portion which is movable and performs opening/closing (hereinafter referred to as a movable body), such as a mating part of the lock, a door, a stopper, and a main body which is immovable. When the movable body is in an open position, an inside is opened, and when the movable body is in a close position, the inside is closed (and further locked in such a state).

The first antenna is installed in the movable body assumed as the first member, and the second antenna is installed in the main body assumed as the second member. The non-contact IC tag is configured such that when the movable body is in the close position, communication can be performed by means of the second antenna. When the movable body is moved to the open position, distance between the first antenna and the second antenna is increased and long-distance communication cannot be performed. Thus an unlock state can be thereby detected.

(iii) Detection of Appropriate/Inappropriate Fitting of Slide-Fitting Parts

The non-contact IC tag can be used for slide-fitting parts. Specific examples include a connector portion of a USB component, a printer ink, an interlocking button, and the like. The first antenna is installed in a sliding member assumed as the first member, and the second antenna is installed in a main body to be fitted assumed as the second member. The non-contact IC tag is configured to be able to perform communication by means of the second antenna when an appropriate slide-fitting is performed. When the sliding member is not fitted appropriately, the first antenna and the second antenna do not come close to each other sufficiently and long-distance communication cannot be performed. Thus an inappropriate fitting state can be thereby detected.

(iv) Detection of Falling-Down

When an object is moved from a predetermined position, such a state is detected. For example, the non-contact IC tag is used to detect that an article placed in a box, an inside of which cannot be observed from outside, falls down or is displaced. The first member is installed on the object article, and the second member is installed on a placement surface in a box or the like. The non-contact IC tag is configured to be able to perform communication by means of the second antenna when the article is in an appropriate position. When the article falls down or is displaced, the first antenna and the second antenna are not sufficiently close to each other and long-distance communication cannot be performed. Thus falling-down or displacement of the article can be thereby detected. The non-contact IC tag may be configured to be able to detect a state where the article falls down due to earthquake or the like.

MODIFIED EXAMPLES

Although the embodiment of the present invention has been described above, it should be noted that the present invention is not limited to the above embodiment and can be carried out in various modes within the technical scope of the present invention.

In the above embodiment, the protruding portion 25 and the axial portion 27 are exemplified as the movement restriction unit. However, the present invention is not limited to that.

In the above embodiment, a configuration is exemplified in which rotation of the first member 11 is suppressed by engaging the protruding portion 25 with the opening 43. However, the rotation of the first member 11 may be suppressed by a configuration other than that. For example, configurations may be adopted in which the movement of the first member 11 is suppressed by increasing friction force generated when the first member 11 is rotated or in which the first member 11 is fixed with a screw, a clip, or the like.

Moreover, the first member 11 may be configured so as not to be able to be moved unless the first member 11 or the second member 13 is distorted or broken, once the first member 11 is placed into the lock state.

Although in the above embodiment a configuration is exemplified in which the first antenna 23 and the second antenna 31 are electromagnetically coupled to each other in the lock state, a configuration may be adopted in which the first antenna 23 and the second antenna 31 are electrically conducted to each other directly.

Furthermore, forms of the first antenna 23 and the second antenna 31 are not limited to those shown in FIGS. 1A to 2B, and can be shaped variously. It is preferable to use the second antenna having a gain greater than that of the first antenna.

In the above embodiment, a configuration is exemplified in which the first member 11 and the second member 13 are rotatably and displaceably coupled to each other about the axial portion 27 by inserting the axial portion 27 into the through-hole 45. However, the first member 11 and the second member 13 may be coupled in a configuration other than the above one. In such a case, rotation and displacement do not have to be performed. For example, a configuration may be adopted in which the first member 11 and the second member 13 are coupled to each other by means of a ring-like or a string-like member.

What is claimed is:

1. A non-contact IC tag comprising:
   a first member including an IC chip and a first antenna connected to the IC chip;
   a second member including a second antenna; and
   a movement restriction unit that, when the first member is moved to a predetermined position in the second member, restricts a movement of the first member from the predetermined position,
   wherein the predetermined position is a position where the first antenna and the second antenna are electromagnetically coupled to each other or a position where the first antenna and the second antenna are electrically conducted to each other;
   a coupling unit couples the first member and the second member to one another so that the first member being displacable relative to the second member;

the first member is rotatable, with respect to the second member, by the coupling unit about a predetermined rotational axis; and the first member is displaceable between a predetermined position and a position displaced from the predetermined position.

2. The non-contact IC tag according to claim 1, wherein the first member and the second member are configured to form an annular body at least when the first member is in the predetermined position, and to open a part of the annular body when the first member is in an open position which is different from the predetermined position.

3. The non-contact IC tag according to claim 1, wherein the second member has a gap portion capable of housing the first member.

4. A non-contact IC tag comprising:
a first member including an IC chip and a first antenna connected to the IC chip;
a second member including a second antenna;
a movement restriction unit which, when the first member is moved to a predetermined position in the second member, restricting movement of the first member from the predetermined position;
the first antenna and the second antenna, in the predetermined position, being one of electromagnetically coupled and electrically conducted to one another;
the non-contact IC tag having a first communication distance, while in the predetermined position, and the non-contact IC tag having a second communication distance, when moved out of the predetermined position; and
the first communication distance that being at least three orders of magnitude greater than the second communication distance.

5. The non-contact IC tag according to claim 4, wherein the first communication distance is at least a plurality of meters and the second communication distance is 2 mm or less.

6. The non-contact IC tag according to claim 4, wherein the first member is inserted into the second member through a crevice in a front side of the second member until a coupling unit couples the first member to the second member,
the first member is rotatable about an axis defined by the coupling unit, between the predetermined position and a coupling and uncoupling position spaced from the predetermined position, through a top side of the second member, and
the top side of the second member is adjacent to the front side of the second member.

7. The non-contact IC tag according to claim 4, wherein a coupling unit is permanently attached to a face of the first member and, when the first member is coupled to the second member, the coupling unit extends through a cylindrical through-hole in the second member and projects out of a back side of the first unit.

8. The non-contact IC tag according to claim 4 wherein, when the first member is moved into the predetermined position, the movement restriction unit is inserted into and releasably engaged by an opening in an inner surface of the second member;
when the movement restriction unit is engaged by the opening, the first member is prevented from rotating with respect to the second member;
when the movement restriction unit is disengaged from the opening, the first member is allowed to rotated with respect to the second member; and
the movement restriction unit extends from the first member parallel to and spaced from a coupling unit.

* * * * *